United States Patent
Wanat et al.

(10) Patent No.: US 6,852,405 B2
(45) Date of Patent: Feb. 8, 2005

(54) ACRYLIC POLYMER CAPSTOCK WITH IMPROVED ADHESION TO STRUCTURAL PLASTICS

(75) Inventors: Robert A. Wanat, Langhorne, PA (US); Leslie A. Cohen, Langhorne, PA (US)

(73) Assignee: Atofina, Puteaux (FR)

( * ) Notice: Subject to any disclaimer, the term of this patent is extended or adjusted under 35 U.S.C. 154(b) by 78 days.

(21) Appl. No.: 09/881,087

(22) Filed: Jun. 14, 2001

(65) Prior Publication Data

US 2002/0025420 A1 Feb. 28, 2002

Related U.S. Application Data

(60) Provisional application No. 60/218,703, filed on Jul. 17, 2000.

(51) Int. Cl.$^7$ .......................... B32B 27/08; B32B 27/30; B29C 47/14
(52) U.S. Cl. ............. 428/332; 264/173.17; 264/173.19; 264/174.1; 428/516; 428/517; 428/519; 428/520
(58) Field of Search ........................ 264/173.17, 173.19, 264/174.1; 428/332, 516, 517, 519, 520

(56) References Cited

U.S. PATENT DOCUMENTS

| | | | | |
|---|---|---|---|---|
| 3,793,402 A | * | 2/1974 | Owens | 525/81 |
| 5,169,903 A | * | 12/1992 | Toritani et al. | 525/310 |
| 6,147,162 A | * | 11/2000 | Tadokoro et al. | 525/222 |
| 6,420,050 B2 | * | 7/2002 | Birch et al. | 428/517 |
| 6,444,298 B1 | * | 9/2002 | Tadokoro et al. | 428/213 |

* cited by examiner

*Primary Examiner*—D. S. Nakarani
(74) *Attorney, Agent, or Firm*—Thomas F. Roland; Gilbert W. Rudman

(57) ABSTRACT

Disclosed is a composite sheeting comprised of polystyrene having a thin protective layer of an acrylic ester polymer and a process for producing the composite sheeting.

The process comprises joining a molten stream of each polymeric material in a single extruder discharge conduit such that there is produced a single molten stream having a reasonably well defined interface between the two types of polymeric material, and thereafter, passing the resulting single stream of material through a sheet-form extrusion die having its die lips generally aligned with the foregoing interface.

13 Claims, No Drawings

ACRYLIC POLYMER CAPSTOCK WITH IMPROVED ADHESION TO STRUCTURAL PLASTICS

REFERENCE TO RELATED APPLICATION

This application claims the benefit of United States Provisional Application Serial No. 60/218,703, filed Jul. 17, 2000.

BACKGROUND OF THE INVENTION

1. Field of the Invention

This invention is in the field of capstock for plastics. More particularly, this invention relates to acrylic resin compositions which are especially useful as capstock materials for coextrusion over or lamination to structural plastics, especially polystyrene, as well as to the manufacture of such composites and to the articles produced therefrom.

2. Prior Art

Certain structural plastics, such as high impact polystyrene (HIPS), acrylonitrile/butadiene/styrene (ABS) resins, poly(vinyl chloride) (PVC) resins, and the like, exhibit attractive mechanical properties when extruded, molded, or formed into various articles of manufacture. Such articles include, for example, bathtubs, shower stalls, counters, appliance housings and liners, building materials, such as doors, windows and shutters, and storage facilities. Although these structural plastics are strong, tough and relatively inexpensive, the properties of their exposed surfaces are less than ideal. That is, the surfaces of the structural plastics are degraded by light; they can be easily scratched; they are eroded by common solvents, etc.

Consequently, it has become a practice in the industry to apply another resinous material over the structural plastic to protect the underlying structural material and provide a surface that can withstand abuse associated with the use environment. Such surfacing materials are called "capstocks".

The capstock generally is much thinner than the structural plastic, typically being about 10 to about 25% of the total thickness of the composite comprising the capstock and structural plastic plies. For example, the thickness of the capstock can be about 0.1 to about 2.5 mm, whereas the thickness of the structural plastic ply can be about 1.0 to about 10 mm.

As a class, acrylic resins, known for their excellent optical characteristics, resistance to degradation by sunlight, hardness, inertness to water and common chemicals, durability, and toughness, are capstocks of choice for various structural plastics, such as ABS sheet. The mechanical properties of the capstock generally are secondary to those of the structural plastic, but it is important that the capstock not adversely affect the mechanical properties of the composite.

A resinous capstock, including one comprising an acrylic resin, can be applied to a structural plastic in several different ways. For example, preformed sheets or films of the structural plastic and the capstock can be laminated together, as by thermal fusion, by press lamination, or by lamination via an appropriate adhesive or via a mutually compatible polymer interlayer.

Other methods of lamination, such as co-calendering or bi-extrusion or even solution or dispersion casting, can be used to laminate structural plastics and an acrylic capstock. Alternatively, in appropriate cases, the structural plastic and an acrylic capstock can be coextruded, particularly feedblock coextruded, and this is often a choice method when the laminate is an acrylic-capped ABS sheet. A sheet of the composite can then be thermoformed into an article such as a bathtub, a shower stall, a counter top, etc.

Equipment for such coextrusion is widely available in the industry. The term "feedblock coextrusion," as used herein, refers to a process in which each of a resin supply of a first plastic material (for example, a structural plastic material) and a resin supply of a second plastic material (for example, a capstock material) is heated to a molten condition as separated streams thereof are fed to a feedblock in which the streams are brought together in face to face surface contact to form a two-ply stream which in turn is fed to a sheet die in which the two-ply stream is spread laterally into a two-ply sheet under conditions of laminar flow, with the molten resin plies of the sheet being in face to face surface contact as they emerge from the die, the shaped two-ply sheet thereafter being cooled and solidified, the resultant composite comprising each of the plies of the sheet integrally bonded to each other by the solidified resins comprising the sheet. As is known in the art, the process of feedblock coextrusion can be used to produce a sheet of more than two plies by use of a feedblock which is designed to accommodate more than two streams of resin. In a process for forming a two- or higher-ply sheet, the edges of the sheet are usually trimmed, and ideally, the trimmings are recycled into the structural plastic feed to conserve material and realize economies.

A condition for use is that the capstock must have excellent adhesion to the structural plastic. However, in current acrylic resin capstock over, for example, High Impact PolyStyrene (HIPS) films or sheet articles, adhesion is unsatisfactory for commercial applications. To achieve a desirable or improved level of adhesion between the two layers, a third polymer is typically extruded in between the acrylic and HIPS, the so-called adhesive layer. An example of an adhesive layer is a MMA/styrene copolymer that has compatibility and/or miscibility with PMMA and HIPS. Prior art reference U.S. Pat. No. 4,350,742 discloses an alternative way to improve the adhesion between an acrylic and styrenic layer, co-polymerized 3–30 weight percent of $\alpha$, $\beta$-unsaturated carboxylic acid monomer with the styrene to obtain good adhesion to the acrylic resin. The use of the intermediate layer results in additional processing steps, costs and weight to the composite. It is therefore a primary object of the invention to provide a coextruded product comprised of two layers, the first layer comprised of a structural plastic, preferably, high impact polystyrene, and a second layer being comprised of (a) an acrylate resin and (b) an acrylic polymeric additive that increases the adhesive strength between the layers.

A specific object of the invention lies in the production of a multiple-layered sheet comprised primarily of polystyrene and having a protective surface layer of an acrylic capstock.

Other objects, features and advantages of this invention will become apparent from the description which follows.

SUMMARY OF THE INVENTION

The present invention relates to the provision of acrylic compositions which can be employed as capstock for HIPS and similar structural plastics in composites which can be formed readily by use of feedblock coextrusion. The present invention relates to an acrylic resin composition which can be used to form capstock having improved adhesion to structural plastic.

In addition, the present invention allows the acrylic capstock layer to essentially retain all acrylic positive properties. This is versus a compositional change to the acrylic resin that could adversely effect positive acrylic properties, such as: optics, weathering, and gloss.

There is provided according to the invention a composition for use as a capstock, the composition comprising a blend of an acrylic ester polymer and acrylic polymeric additive.

In another embodiment of the invention there is provided a composite product of structural plastic having a relatively thin protective layer of a blend of an acrylic ester polymer and acrylic polymeric additive and a process for producing the composite.

The process comprises joining a molten stream of structural plastic and a molten stream of acrylic and acrylic polymeric additive in an extruder discharge conduit to form a single stratified stream of molten material conforming to the cross-section of the conduit and having a relatively sharply defined interface between the polystyrene and acrylic/additive, and thereafter passing this stratified stream through a sheet-form extrusion die having its die lips generally aligned with the foregoing interface.

In another embodiment of the invention, the acrylic resin capstock composition is comprised of:
a) 10–95% polymethyl methacrylate or an alkyl methacrylate/alkyl acrylate copolymer based matrix;
b) 0–60% modifiers; and
c) 5–40% additive acrylic polymer which is comprised of
5–90% methyl methacrylate,
10–95% $C_2$–$C_6$ alkyl methacrylate,
preferably $C_4$, and
0–10% methacrylic acid, acrylic acids or $C_{1-5}$ esters thereof.

In another preferred embodiment, the polymeric additive is 20–50% MMA and 50–80% BMA having a molecular weight from 40,000–300,000, preferably 40,000–100,000.

In an even more preferred embodiment, the additive acrylic polymer is a 50–80% methyl methacrylate and 20–50% butyl methacrylate (BMA) polymer having a (Mw) molecular weight from 40,000–300,000, preferably 40,000–100,000.

The invention will be more readily understood by reference to the following detailed description.

DETAILED DESCRIPTION OF THE INVENTION

As used herein, the term "molecular weight" means weight average molecular weight. Molecular weight is estimated by conventional gel permeation chromatographic methods, using methacrylate standards for calibration. The term "dalton" means atomic mass unit.

In accordance with this invention it has been discovered that a multiple-layered sheet or film may be produced from two polymeric materials which have hitherto been found extremely difficult to unite by conventional extrusion techniques or by post-extrusion laminating procedures.

Specifically, the sheeting or film of the invention consists of a layer of structural plastic having a thickness substantially corresponding to the final composite sheeting thickness desired, and adhered to either one or both sides of the structural plastic layer, a relatively thin exterior layer of a blend of acrylic ester polymer and acrylic polymeric additive. Thus, there is provided composite sheeting having the desirable economic characteristics of structural plastic and concurrently possessing the highly desirable surface properties of acrylic polymers.

An important aspect of the invention resides in the discovery that an essentially uniform and relatively thin layer of an acrylic capstock may be firmly united to the structural plastic sub-layer in a single extrusion step.

Although similar extrusion processes are known in the art, the same relate to extrusion of chemically similar or at least compatible resinous materials, whereas the process of this invention has been successfully applied to chemically and physically dissimilar resins. Specifically, it has been discovered that polystyrene and an acrylic can be co-extruded to produce a multilayered sheet exhibiting strong adhesion between acrylic and polystyrene layers if the acrylic layer is a blend of an acrylic ester polymer and acrylic polymeric additive.

The fact that a strongly adhering multiple-layer sheeting can be obtained from an acrylic and polystyrene in accordance with the foregoing discovery is indeed surprising, since other polymeric materials normally incompatible with polystyrene, such as polyolefins, cannot be co-extruded with polystyrene to yield a satisfactorily adhering multilayered product regardless of the proximity achieved between viscosities of the two polymers.

The principles of the invention are generally applicable to the manufacture of either multilayer polymeric "film" (less than 10 mils in thickness) or "sheeting" (10 mils or thicker). Thus, broadly speaking, it is possible to produce a composite film having a 1 mil or thinner surface layer of an acrylic polymer on a 4 or 5 mil, or even a 1 mil base layer of polystyrene. But practically speaking, the products of most interest are multilayer sheets of from 10 mils up to ½ inch in thickness having acrylic surface layers measuring from a fraction, e.g., ¼ or ½ mil, to several mils. Accordingly, it will be appreciated that volumetric feed rates for the acrylic polymer component are frequently very small, e.g. less than 1%, when thicker sheeting is desired, and likewise that rates in excess of 20 or 25% are also contemplated when very thin film is produced.

Impact grade acrylics are commonly used as acrylic ester polymer capstock (protective layer) over ABS, PVC, and other resins to provide good appearance, gloss, surface hardness, and weather resistance to sheet and formed parts.

Customers would like to be able to bring these acrylic features to sheet made using High Impact PolyStyrene (HIPS), but can not do so in a cost effective and highly successful manner because common acrylic resins have poor adhesion to HIPS. Depending on the complexity, thickness, and temperature of formation of the part the acrylic capstock/HIPS composite could readily delaminate. The objective of this invention is to develop an acrylic resin product that maintains the desirable acrylic features while adding good adhesion to HIPS.

As a class, acrylic resins, known for their excellent optical characteristics, surface gloss, resistance to degradation by sunlight, hardness, inertness to water and common chemicals, durability, and toughness, are capstocks of choice for various structural plastics. The mechanical properties of the capstock generally are secondary to those of the structural plastic, but it is important that the capstock not adversely affect the mechanical properties of the composite.

The term "acrylic ester polymer(s)" as used herein means
1) alkyl methacrylate homo polymers,
2) copolymers of alkyl methacrylates with other alkyl methacrylates or alkyl acrylates, or methacrylic acid
3) alkyl acrylate homopolymers, and
4) copolymers of alkyl acrylates with other alkyl acrylates or alkyl methacrylates.

The alkyl group can be from 1–18 carbon atoms, preferably 1–4 carbon atoms. Preferred are polymethyl methacrylate and copolymers of methyl methacrylate with from about 0.1–20% alkyl acrylates, wherein the alkyl contains 1–4 carbon atoms.

Preferably the acrylic resin used as the matrix material of the capstock comprises a polymer or copolymer of methyl methacrylate (MMA); typical copolymers include 80 to >99% MMA and <1 to 20%, preferably 1 to 10%, of (C1–C10) alkyl acrylates, such as methyl acrylate and ethyl acrylate (EA). A suitable commercially available poly (methyl methacrylate) type thermoplastic matrix material is Plexiglas® V-grade molding powder, such as Plexiglas® V-825, V-826, V-825HID, V-045, V052, VM, VS, and V-920 etc.

The matrix materials can be made by many different processes known in the art, including continuous cell casting, emulsion, suspension, bulk polymerization, and continuous stirred tank reactions (CFSTR), etc. Each of these methods uses free radical polymerization chemistry. It should also be noted that the art also contains Ionic polymerization methods to prepare acrylic.

The matrix may also include other modifiers or additives that are well known in the art. For example, the composition may contain impact modifiers, external lubricants, antioxidants, flame-retardants or the like. If desired, ultraviolet stabilizers, flow aids, metal additives for electronic magnetic radiation shielding such as nickel coated graphite fibers, anti-static agents, coupling agents, such as amino silanes, and the like, may also be added.

A rubber modifier can be added to the acrylic matrix to enhance its performance properties. The rubber modifier is usually made by an emulsion process. In an emulsion process, particles which are generated are usually small, 0.05–5 micrometers. In an emulsion process, the major components are monomers, water, emulsifiers, water-soluble initiators, and chain transfer agents. The water to monomer ratio is controlled between 70:30 and 40:60. A core/shell particle structure can be achieved through grafting by an emulsion process, which is often a preferred process for making impact modifiers.

The blend of the multi-stage polymer (rubber modifiers) with the thermoplastic polymer can be accomplished by any known method, such as dispersing the multi-stage polymer in a monomer mixture used to prepare the thermoplastic polymer, or in a monomer-polymer syrup mixture which together would provide the desired thermoplastic polymer. Alternatively, the multi-stage polymer can be placed in a casting mix in the form of an emulsion, suspension or dispersion in water or in an organic carrier; the water or organic carrier can then be removed before or after casting into the final thermoplastic polymer form. The multi-stage polymer may also be blended with the thermoplastic polymer by extrusion compounding.

Additional specific methods and details of synthesizing and blending the thermoplastic polymer and impact modifiers are disclosed in Owens et. al. U.S. Pat. No. 3,793,402.

A preferred thermoplastic material is impact modified poly(methyl methacrylate) commercially available as for example, Plexiglas® DR101, Plexiglas® MI-7, Plexiglas® HFI10 molding powder. Plexiglas® in North and South America, and Oroglas® in Europe and Asia are trademarks of ATOFINA, Paris, France.

The composition of the acrylic polymeric additives may be 5–90% methyl methacrylate, 10–95% $C_2$–$C_4$ alkyl methacrylate, and optionally 0–5% acrylic monomers such as methacrylic acid, acrylic acid or $C_1$–$C_5$ esters thereof, and can made by the same processes as the matrix polymers.

In preferred embodiment the polymeric additive is 80–20% MMA and 20–80% BMA having a molecular weight from 40,000–300,000, preferably 40,000–100,000.

In a more preferred embodiment, the acrylic polymeric additive is a 50–80% methyl methacrylate and 20–50% butyl methacrylate (BMA) polymer having a (Mw) molecular weight from 25,000–300,000, preferably 25,000–100,000.

In one embodiment of the invention, the polymeric additive can be extrusion melt blended into ATOFINA Chemicals, Inc. Plexiglas V-grade or impact acrylic grade resin to give a resulting optically clear acrylic blend that has much improved adhesion to high impact polystyrene (HIPS) than acrylics without the additive when the acrylic and HIPS are co-extruded together.

The addition of 5 to 40, preferably around 5 to 30, most preferably about 10 to 25 weight percent of a MMA/BMA copolymer has been found to give a noticeable and beneficial improvement in adhesion to co-extruded acrylic/HIPS film or sheet without adverse effects on the beneficial acrylic physical properties.

Examples of structural plastics include: acrylonitrile/butadiene/styrene (ABS) resins, ASA, polyolefins such as polyethylene and filled polyethylene, polypropylene, polypropylene modified with ethylenepropylene-diene rubber; polypropylene grafted with (meth)acrylic polymers, styrene/(meth)acrylic polymers; polyamides, polyamide/polymer blends, such as polyamide/ABS and polyamide/polycarbonate and the like; styrene/acrylonitrile, styrene/acrylonitrile—multistage polymer blends; polymers of alpha-methylstyrene/acrylonitrile, alpha-methylstyrene/styrene/acrylonitrile, alpha-methylstyrene/methyl methacrylate/ethyl acrylate; polycarbonate, polycarbonate-ABS blends, polycarbonate-multistage polymer blends; polyesters such as polyethylene terephthalate, polybutylene terephthalate, polybutylene terephthalate-polycarbonate blends, polybutylene terephthalate-polycarbonate copolymer blends; polyvinyl chloride-multistage polymer blends, polyvinyl chloride-(meth)acrylate blends, chlorinated polyvinyl chloride, polyvinyl chloride-ABS blends; acrylonitrile/(meth)acrylate/styrene, polyethylene terephthalate-glycol modified, polyarylate, poly(meth)acrylates, polyacetal, polystyrene and high impact polystyrenes, styrene/maleic anhydride and styrene/maleimide polymers, polyvinylidene fluoride, polyvinylidene fluoride-multistage polymer blends, cellulosics, polyamideimide, polyetheresters, polyetheresteramide and polyetheramide, polyphenylene oxides, and polysulfones. Blends may be prepared from other polymer systems including polyphenylene sulfide, polyphenylene oxide, polysulfone, polyphenylene oxide-styrene blends, polyphenylene oxide-high impact polystyrene blends, polyvinylidene chloride, polyvinylidene chloride/(meth)acrylonitrile, polyvinylidene chloride/(-meth) acrylate, polyvinylidene chloride/polyvinyl chloride blends and copolymers, polyvinyl acetate, polyetheretherketone, polyetherimide, thermoplastic polyimides, polyolefins such as polyethylene, polypropylene, and copolyolefins, and other polymer types. Random or block copolymers which combine different functionalities also can be used, and ternary or higher blends can be made from combinations of these polymer types for use as substrates with the capstocks of this invention.

Preferred for use in the present invention is polystyrene. The term polystyrene as employed herein includes both homopolymers of styrene and copolymers of styrene with other polymerizable and polymerized monomers. Included within the latter category are impact polystyrenes which comprise graft copolymers of styrene upon conjugated diene backbone polymers such as polybutadiene, butadiene-styrene copolymers, butadiene acrylonitrile copolymers, natural rubber, etc. Likewise included in this category are normal copolymers of styrene with other well known, conventional monomers.

HIPS (high impact polystyrene) is part of the styrenic family. HIPS is made by the addition of a polybutadiene rubber to PS using the mass process and, is specified where more toughness is required. The rubber particles are dispersed throughout the PS matrix as discrete particles whose amount, type, and size can be controlled to tailor the properties of the resin. HIPS can be processed by extrusion and co-extrusion, thermoforming, injection molding, structural foams, and blow molding. Recent technical advancements have allowed HIPS to enter markets previously limited to ABS.

These polymers and structural plastics may be used singly as the structural plastic with the capstocks of this invention. The polymers and structural plastics and blends may contain acrylic or (meth)acrylic/butadiene/styrene ("MBS") or ethylene/propylene/diene ("EPDM") polymer impact modifiers. They also may incorporate fillers described herein below and they also may be foamed.

In addition to useful articles such as bathtubs, shower stalls, counters, and storage facilities mentioned above which can be fashioned from the plastic composites of this invention, examples of other useful articles include automotive applications such as decorative exterior trim, molding side trim and quarter panel trim panels, fender and fender extensions, louvers, rear end panels, caps for pickup truck back, rearview mirror housings, accessories for trucks, buses, campers, vans, and mass-transit vehicles, b-pillar extensions, and the like; appliances and tools such as lawn and garden implements, bathroom fixtures for mobile homes, fencing, components of pleasure boats, exterior components of mobile homes, lawn furniture such as chair and table frames, pipe and pipe end caps, luggage, shower stalls for mobile homes, toilet seats, signs, spas, air conditioner and heat pump components, kitchen housewares, bead-molded picnic coolers, picnic trays and jugs, and trash cans; venetian blind components; sporting goods such as sailboards, sailboats; plumbing parts such as lavatory parts and the like; construction components, in addition to those mentioned previously, the additional components including architectural moldings, door molding, louvers, and shutters, mobile home skirting, residential or commercial doors, siding accessories, window cladding, storm window frames, skylight frames, end caps for gutters, awnings, car port roofs, and the like.

In terms of HIPS such articles include products for sanitary applications (tubs, shower surrounds, or spas) and use in appliance housings or doors (appliances such as washing machines, dryers, and refrigerator and freezers).

Although structural plastics made from HIPS are strong, tough and relatively inexpensive, the properties of their exposed surfaces are less than ideal. That is, the surfaces of the HIPS are easily degraded by light, easily scratched, and eroded by common chemicals (such as oil and butter). Consequently, it has become a practice in the industry to apply another resinous material over the structural plastic to protect the underlying structural material and provide a surface that can withstand abuse associated with the use environment. Such surfacing materials are called "capstocks". The capstock generally is much thinner than the structural plastic, typically being about 10 to about 25% of the total thickness of the composite comprising the capstock and structural plastic plies. For example, the thickness of the capstock can be about 0.1 to about 2.5 mm, whereas the thickness of the structural plastic ply can be about 1.0 to about 12 mm.

As mentioned above, the laminate or capstocked materials of this invention generally are made by feedblock co-extrusion, a preferred method, but other extrusion or casting methods also may be employed, such as press lamination, bi-extrusion, co-calendering, and tri-extrusion which may incorporate an intermediate adhesive or other layer. Even solution casting methods may be used to provide laminated materials of the invention.

A resinous capstock, including one comprising an acrylic resin, can be applied to a structural plastic in several different ways. For example, preformed sheets or films of the structural plastic and the capstock can be laminated together, as by thermal fusion, by press lamination, or by lamination via an appropriate adhesive or via a mutually compatible polymer interlayer.

Other methods of lamination, such as co-calendering or bi-extrusion or even solution or dispersion casting, can be used to laminate structural plastics and an acrylic capstock. Alternatively, in appropriate cases, the structural plastic and an acrylic capstock can be co-extruded, particularly feedblock co-extruded, and this is often a choice method due to cost and ease of fabrication. The technique for producing a sheet of such composite by feedblock co-extrusion is described, for example, in U.S. Pat. Nos. 3,476,627; 3,557,265; and 3,918,865. Equipment for such co-extrusion is widely available in the industry. The term "feedblock co-extrusion," as used herein, refers to a process in which each of a resin supply of a first plastic material (for example, a structural plastic material such as HIPS) and a resin supply of a second plastic material (for example, a capstock material such as acrylic resin) is heated to a molten condition as separated streams thereof are fed to a feedblock in which the streams are brought together in face to face surface contact to form a two-ply stream which in turn is fed to a sheet die in which the two-ply stream is spread laterally into a two-ply sheet under conditions of laminar flow, with the molten resin plies of the sheet being in face to face surface contact as they emerge from the die, the shaped two-ply sheet thereafter being cooled and solidified, the resultant composite comprising each of the plies of the sheet integrally bonded to each other by the solidified resins comprising the sheet.

Resin compositions of this invention also can be extruded or injection molded into monolithic sheet and film stock using conventional methods well known in the art.

The invention refers to a two layer or more co-extruded composite where the top most layer is an acrylic polymer and the layer bonded to the acrylic layer is a styrenic polymer, such as high impact PS (HIPS) or PS, or crystalline PS, or a blend of the mentioned polymers. Polymers, such as, acrylic polymers and impact modified acrylic polymers can be used as the polymeric top layer of the composite. Preferably, the polymer is an acrylic; more preferably, an impact modified acrylic polymer.

Composite materials that include a capstock polymeric layer over a substrate thermoplastic layer are normally formed by co-extrusion of the layers together to from a composite structure. In U.S. Pat. No. 5,318,737 an acrylic capstock is co-extruded over ABS. Here, within, we co-extrude acrylic over HIPS to form a similar composite structure, but here we are using the more cost effective HIPS versus ABS.

Optional ingredients that may be used in the composition of the present invention, either in the capstock or in the structural plastic or in both, are color concentrates, for example, dyes and pigments, lubricants, UV stabilizers, thermal stabilizers, antioxidants, heat distortion temperature improvers, antistatic agents, physical or chemical blowing agents, nucleating agents, matting agents, flame retardants, and processing aids. In general, the total amount of such optional ingredients will generally not exceed about 5 wt. % of the composition, for example, about 1 to about 5 wt. % of such ingredients.

Additionally, fillers such as wood fibers, carbon fibers, glass fibers, glass beads, and minerals such as calcium carbonate, talc, titanium dioxide, barium sulfate, and the like optionally may be included in the composition of the present invention. The total amount of such optional fillers will generally not exceed about 15 weight % in the capstock and about 65 weight % in the structural plastic or substrate.

The following examples are illustrative of the invention but are not intended to be exhaustive or to limit the invention to the precise form disclosed. Many other variations and modifications are possible in light of the specification and examples.

Preparation of Laminate Including Capstock

The equipment which may be used to produce laminates of the present invention includes equipment which consists of an extruder to melt and pump each material (the acrylic resin composition of the below examples and the HIPS resin), a combining feedblock to combine the two melt streams from the extruders, and a conventional single-manifold sheet die from which the two-layer extrudate exits onto conventional 3-roll stack polishing unit, cooling rack, and pull rolls. This equipment is well known in the art.

The equipment is heated to desired operating temperatures and then the secondary (satellite) extruder for the acrylic resin composition is started. After running the acrylic resin composition long enough to fill the feedblock and die, the primary extruder for the HIPS substrate material is started. With both melts exiting the die together, the sheet line is strung up in the usual fashion with screw speeds and line speeds gradually increased and various adjustments made to produce the desired layer thickness combination at the desired output rate.

Typical extrusion temperatures for HIPS is about 375–430° F. (460° F. maximum temperature). Typical extrusion temperatures for the acrylic capstock is about 375° F.–490° F.

Adhesion Test

The test used here within for adhesion consists of the following procedure. The first part of the test consists of wedging a razor blade between the two layers and then physically pulling the two layers apart. An adhesion rating system was set up as the following: poor, fair, good and excellent and subcategories of poor/fair, fair/good, good/excellent. Two different analysts reproduced each test at least three times. In the rare cases where there was disagreement, the tests were re-run with the analysts agreeing on a consensus rating.

EXAMPLE 1

Example 1 exemplifies the benefits of an MMA/BMA polymer in a PMMA capstock to enhance adhesion to HIPS. Demonstrated is that only 3.6% BMA in the total acrylic layer (comprised of a commercial impact acrylic plus an acrylic copolymer additive that contains BMA) offers surprising benefits of adhesion to HIPS.

The acrylic polymers in Example 1 are co-extruded over HIPS with the Killion extruders set at 440° F. zone temperatures for the acrylic layer and for the HIPS layer. The main extruder runs at around 900–1000 psi and at 40 rpms, while the satellite extruder runs at around 550 psi and at around 50–68 rpms. The HIPS used is Amoco I 400E which is a high impact medium flow general purpose HIPS marketed by Amoco Chemicals.

| | Acrylic Compositon | Total Level of BMA in composition | Adhesion |
|---|---|---|---|
| A | DR101 Commercial impact acrylic | 0% | Fair/Poor |
| B | HFI10 Commercial impact acrylic | 0% | Fair |
| C | V825 Commercial standard acrylic | 0% | Fair/Poor |
| D | 85% MMA/12% BMA/3% EA | 12% | Fair/Poor |
| E | 60% MMA/40% BMA | 40% | Excellent |
| F | HFI10-101 Commercial Impact Acrylic + 10% P (64% MMA/36 BMA) Mw 50,000 | 3.56% | Good |

The P (60 MMA/40 BMA) was prepared by the continuous mass process and has a Mw=280,000, pd=1.7.

EXAMPLE 2

Example 2 exemplifies the benefit of specific acrylic copolymers, and the amounts of the BMA and EA necessary in the copolymers, on acrylic adhesion with HIPS. It appears that one needs above a certain level of butyl methacrylate (BMA) in the MMA based copolymer, when it is not used as an additive, to achieve improved adhesion. The acrylic polymers in Example B are co-extruded over HIPS with the Killion extruders set at 450° F. –475° F. zone temperatures for the acrylic layer and 460° F. zone temperatures for the HIPS layer. The HIPS used is Amoco I 400E which is a high impact medium flow general purpose HIPS marketed by Amoco Chemicals.

| Acrylic Composition | Total Level of BMA in composition | Total Level of BA in composition (%) | Adhesion |
|---|---|---|---|
| 85 MMA/12 BMA/3 EA | 12% | — | Fair/poor |
| 95 MMA/5 BA | — | 5 | Fair/poor |
| 88 MMA/12 BA | — | 12 | Fair/poor |
| DR101 commercial impact acrylic | | | Poor |
| 68 MMA/32 BMA | 32% | | Excellent |
| 67 MMA/31 BMA/2 EA | 31% | | Excellent |

EXAMPLE 3

Example 3 demonstrates how a P(MMA/BMA) copolymer with 32% BMA adheres to Polystyrene (Dow PS). The tabulated acrylic polymers are compression molded on a Carver Press, at 380° F. and at 1500 psi for 2 minutes, over Polystyrene. It appears that more than 14% BMA in the acrylic copolymer is needed to obtain benefits of adhesion, under the stated compression molding conditions, but only 3.6% BMA when a copolymer is added to the acrylic layer as an additive.

| Acrylic Composition | Total Level of BMA (%) | Adhesion |
|---|---|---|
| DR101 Commercial Impact Acrylic | 0 | Poor |
| P (88 MMA/12 EA) | 12 | Poor |
| P (86 MMA/14 BMA) | 14 | Poor |
| P (68 MMA/32 BMA) | 32 | Excellent |
| DR101 Commercial Impact Acrylic + 10% P(64.4 MMA/35.6 BMA), Mw 50,000 | 3.6 | Fair/Good |

EXAMPLE 4

Example 4 exemplifies how the polymeric additives P(64.4MMA, 35.4BMA) and P(36.6MMA and 63.4BMA) affect acrylic adhesion to HIPS.

Due to the presence of the additives, the extrusion temperatures are lower than with neat acrylic. The following acrylic polymers are co-extruded over HIPS with the Killion extruders set at 380° F. for the satellite extruder and main extruder. The main extruder is run at 60 rpms and the satellite extruder is run at 30 rpms. It should be noted that the acrylic samples with the P(64.4MMA, 35.4BMA) are clearer and easier to extrude (easier to strand) than the samples containing P(36.6MMA and 63.4BMA), particularly at 10% loadings. Adhesion to HIPS is good in all tested samples. The HIPS used is Huntsman PS 840 J1N a general purpose HIPS without lubricant marketed by Huntsman Chemical Company.

| Sample | Composition | Monomer Ratio | Mw |
|---|---|---|---|
| A | P (MMA/BMA) | 64.4/35.6 | 50,000 |
| B | P (MMA/BMA) | 36.6/63.4 | 65,000 |

| Sample | Acrylic | Additive | Additive Level (weight %) | Adhesion to HIPS | Comment |
|---|---|---|---|---|---|
| 1 | Plexiglas VS | B | 10 | Good | Hazy acrylic blend |
| 2 | Plexiglas VS | B | 25 | Good | Hazy acrylic blend |
| 3 | Plexiglas VS | B | 50 | — | Haze (poorest appear-acne) |
| 4 | Plexiglas VS | A | 10 | Good | Clear acrylic blend |
| 5 | Plexiglas VS | A | 25 | Good | Clear acrylic blend |
| 6 | Plexiglas VS | A | 50 | Good | Clear acrylic blend |
| 7 | Plexiglas HFI 10 | B | 10 | Good | Slight haze |
| 8 | Plexiglas HFI 10 | B | 25 | Good | Clear acrylic blend |
| 9 | Plexiglas HFI 10 | B | 50 | — | Could not run |
| 10 | Plexiglas HFI 10 | A | 10 | Good | Slight haze |
| 11 | Plexiglas HFI 10 | A | 25 | Good | Haze |
| 12 | Plexiglas HFI 10 | A | 50 | — | Too brittle to test |

EXAMPLE 5

To determine the effects of temperature on adhesion of the VS and HFI10 samples above, the VS and HFI-10 samples with and without 10% of B of Example 4, and 10% of A of Example 4 are compression molded on a Carver press, over HIPS at different temperatures. In the below table (Example 5), the data shows that acrylics with B of Example 5 afforded improved adhesion with HIPS versus the acrylics without any of the additives in almost all cases. The data also shows that the addition of A of Example 4 affords improved adhesion versus the addition of B of Example 4. The HIPS used is Huntsman PS 840 J1N a general purpose HIPS without lubricant marketed by Huntsman Chemical Company.

| Acrylic | Additive | Level weight % | Temperature (° F.) | Adhesion |
|---|---|---|---|---|
| VS | — | — | 350 | Fair |
| VS | B | 10 | 350 | Fair |
| VS | A | 10 | 350 | Good |
| HFI10 | — | — | 350 | Good* |
| HFI10 | B | 10 | 350 | Good |
| HFI10 | A | 10 | 350 | Good+ |
| VS | — | — | 380 | Fair |
| VS | B | 10 | 380 | Fair |
| VS | A | 10 | 380 | Good+ |
| HFI10 | — | — | 380 | Good/Fair |
| HFI10 | B | 10 | 380 | Good |
| HFI10 | A | 10 | 380 | Good |
| VS | — | — | 420 | Not run |
| VS | B | 10 | 420 | Good/Fair |
| VS | A | 10 | 420 | Good |
| HFI10 | — | — | 420 | Fair/Poor |
| HFI10 | B | 10 | 420 | Good |
| HFI10 | A | 10 | 420 | Good+ |

Good+ = means that the adhesion is slightly better than Good
* = Good adhesion of standard acrylics to HIPS can occur under a very narrow processing window, such as in the case of the HFT10, at 350° F., in Table F. However, it should be emphasized, that our technology advancement, stated here within, broadens the practical co-extrusion processing window.
VS = Plexiglas ® VS
HFT10 = Plexiglas ® HFI10

EXAMPLE 6

Example 6 exemplifies the positive effects of the Additive A of Example 4 in different grades of acrylic on adhesion to different grades of HIPS. In Example 6, the blends of acrylic and 10 weight percent of the Plastic Additive A of Example 5 are prepared and then co-extruded over HIPS. The blends are prepared on a twin screw extruder at approximately 480° F., 278 rpms, and at a rate of 45 pounds/hour. The co-extrusions are run on a co-extrusion line which consists of two single screw extruders (the HIPS substrate in the main extruder, and the acrylic in the satellite extruder) feeding into a sheet die. The sheet die temperature is set at 420_F. The main extruder with the HIPS is set at 380_F. for each zone. The satellite extruder is set at 430_450_F. for each zone. The bullet temperature is 380_F. The adapter temperature is set at 420_F., and the roll temperatures are set at 140_F.

| Sample | Acrylic Composition | HIPS Grade | Adhesion |
|---|---|---|---|
| Control | DR101 Commercial Impact Acrylic | Chevron Valtra | Fair/Good |
| Blend 1 | DR101 + 10% A | Chevron Valtra | Good |
| Blend 2 | HFI10 + 10% A | Chevron Valtra | Good |
| Blend 3 | HFI10 + 10% A | Huntaman PS 840 J1N | Good |
| Blend 4 | DRT-101 + 10% A | Dow HIPS 495R | Good |
| Blend 5 | V826 + 10% A | Dow HIPS 495R | Good |

Other Plastics Additives tested are
C- 60% MMA/40% BMA
D- 67% MMA/31% BMA/2% EA
E- 68% MMA/32% BMA
F- 80% MMA/20% BMA In summary, it can be said that the present invention provides an improved capstock composition and a composition which is capable of being effectively formed into an article, particularly a laminate, which has excellent properties, including particularly, excellent chemical-resistant properties, weathering resistance and gloss.

What is claimed is:

1. A composite product comprised of a layer of polystyrene structural plastic having a 0.1 to about 2.5 mm thin protective layer comprising:
   a) 10–95% polymethyl methacrylate or an $C_1$–$C_6$ alkyl methacrylate $C_1$–$C_8$ alkyl acrylate copolymer matrix
   b) 0–60% modifiers; and
   c) 5–40% acrylic polymer additive that increases the adhesive strength between the layers which is comprised of
      20–80% methyl methacrylate,
      20–80% butyl methacrylate, and
      0–15% methacrylic acid, acrylic acid or $C_1$–$C_5$ esters thereof.

2. The composite product of claim 1 wherein the acrylic polymer additive is comprised of 20–80% methyl methacrylate and 20–80% butyl methacrylate has a molecular weight from 40,000–300,000.

3. The composite product of claim 2 wherein the acrylic polymer additive is comprised of 50–80% methyl methacrylate and 20–50% butyl methacrylate and has a molecular weight from 40,000–100,000.

4. A co-extruded product comprised of two layers
   (a) a first layer comprised of polystyrene structural plastic and
   (b) a second layer comprised of
      (i) methyl methacrylate resin, and
      (ii) an acrylic polymer additive that increases the adhesive strength between the layers which is comprised of
         (i) 20–80% methyl methacrylate,
         (ii) 20–80% butyl methacrylate, and
         (iii) 0–15% methacrylic acid, acrylic acid or $C_1$–$C_5$ esters thereof.

5. The product of claim 4 wherein the polystyrene structural plastic is a copolymer of acrylonitrile/butadiene/styrene.

6. The product of claim 4 wherein the polystyrene is high impact polystyrene or crystalline polystyrene.

7. The product of claim 4 wherein ratio of the monomer units is
   (a) 50 to 80 wt % methyl methacrylate,
   (b) 20 to 50 wt % butyl methacrylate and
   (c) 0 to 10 wt % methacrylic acid.

8. The product of claim 4 wherein the second layer is comprised of
   (i) 60 to 95 wt % of methylmethacrylate resin and
   (ii) 5 to 40 wt % of the acrylic polymer additive.

9. The product of claim 4 wherein the first layer contains pigments, dyes, fillers, PS, acrylic and HIPS rework, different grades of HIPS.

10. A co-extruded product comprised of two layers
    (A) 50 to 95 wt % being a first layer comprised of high impact polystyrene, and
    (B) 5 to 50 wt % being a second layer being comprised of
       (i) 60 to 95 wt % of an acrylate resin, and
       (ii) 5 to 40 wt % of an acrylic polymer additive which is copolymer or terpolymer that increases the adhesive strength between the layers which is comprised of
          (i) 20–80% methyl methacrylate,
          (ii) 20–80% butyl methacrylate, and
          (iii) 0–15% methacrylic acid, acrylic acid or $C_1$–$C_5$ esters thereof.

11. The product of claim 10 wherein the acrylic polymer additive is a 50–80% methyl methacrylate and 20–50% butyl methacrylate polymer having a molecular weight from 40,000–300,000.

12. The product of claim 10 wherein the acrylic polymer additive is a 20–50% methyl methacrylate and 50–80% butyl methacrylate having a molecular weight from 40,000–100,000.

13. A process for producing a composite of a polystyrene structural plastic and a 0.1 to about 2.5 mm thin protective layer, the process comprises joining a molten stream of polystyrene structural plastic and a molten stream of a blend of an acrylic ester polymer and an acrylic polymeric additive in an extruder discharge conduit to form a single stratified stream of molten material conforming to the cross-section of the conduit and having a relatively sharply defined interface between the structural plastic and the blend, and thereafter passing the stratified stream through a sheet-form extrusion die having its die lips generally aligned with the foregoing interface.

* * * * *